Patented Aug. 21, 1951

2,564,882

UNITED STATES PATENT OFFICE 2,564,882

SATURATING COMPOSITION FOR IMPREGNATING GLASS FIBER SHEET MATERIAL

Richard H. Cubberley, Ridgewood, and William R. Hartmann, East Orange, N. J., assignors to The Patent and Licensing Corporation, New York, N. Y., a corporation of Massachusetts No Drawing. Application November 2, 1946, Serial No. 707,518

4 Claims. (Cl. 260—8)

1

This invention relates to the production of liquid saturating or impregnating compositions suitable especially for the impregnation of preformed strips or sheets of felted mineral fibrous material, such as glass fiber, or fiber derived from rock or slag, to impart thereto certain desirable properties and characteristics.

Glass fiber wool and other types of mineral fiber wool, in the form of felted bats, have heretofore been employed for a variety of purposes. The physical properties of such bats would make them highly desirable for use as an expansion joint material in highway construction, and the like, but for the fact that they do not possess the resilience necessary to enable them to yield by compression under the pressure of thermally expanding concrete sections and, likewise, to return by expansion to approximately their original dimension in order to fill the space between the concrete sections when contracting under lowering temperatures.

Attempts to impart such resilient properties, for example, to glass fiber bats by impregnating them with rubber in the form of an aqueous dispersion, e. g., so-called synthetic rubber latex, such as GR-S or neoprene latex, have proved rather incapable of achieving the desired results, mainly because, upon drying the impregnated bat to eliminate the water phase therefrom, the rubber migrates toward and concentrates at or adjacent the surfaces thereof, leaving the interior of the bat virtually free of the saturant with the result that the mass does not possess any substantial resilience.

One object of the present invention is to provide a composition capable of use for uniformly impregnating preformed mineral fiber bodies as to impart thereto sufficient resilience and toughness to permit use thereof as an efficient expansion joint filler.

Another object is to provide for impregnation of mineral fiber bats with a rubber composition of a character which will not be attended by migration of the rubber component during the stage of drying the bat.

Another object is to treat preformed mineral fiber bodies to promote good resistance toward wetting of the individual fibers by water which may be present under prolonged soaking conditions, so that such soaking can have no deleterious effect on the resilience, strength and toughness thereof.

According to the invention, the composition for obtaining uniform and adequate impregnation of mineral fiber bats, such as, for example, bats

2 formed of fiber glass wool, comprises an aqueous dispersion of rubbery binder, an evanescent wetting agent to insure rapid wetting of the fiber by the rubbery binder, and a thickening agent, the latter in proportion insufficient to produce substantial increase in the inherent viscosity of the dispersion in the concentration initially employed, but capable of inducing negative capillarity during elimination of water. When suitably applied, for instance, to preformed glass fiber sheet material, the composition of the present invention will impart thereto the desired resilience of the mass and other important properties and characteristics, as will be fully set forth hereinafter.

The major portion of the present treating composition is comprised of a rubbery binder in aqueous dispersed form, with which are incorporated, a stabilizer, an anti-oxidant and a curing agent. To this dispersion base there is added a wetting agent which will promote the wetting of the glass fibers by the composition so that the fibrous mass will be permeated thereby rapidly, uniformly and completely. The wetting agent selected obviously must be of a water-miscible character in order to be capable of admixture with an aqueous dispersion. The presence of such a substance in the treated and subsequently dried fibrous mass would render the product highly hydrophilic. This obviously would be objectionable, especially where such product is to be exposed to the weather in use, as in the case of an expansion joint filler strip. Hence, the wetting agent should be selected from among those especially characterized by their evanescent quality. For example, there are certain volatile soaps, such as morpholine soap, ammonium oleate and the like which will provide good initial wetting during saturation of the preformed glass fiber bodies, but which are decomposable under the elevated temperatures applied during heat-drying of the saturated mass. By the use of such an evanescent wetting agent, impregnation of the felted bats with the rubber composition is facilitated without at the same time decreasing the water repellency of the finished product.

In order to overcome the tendency for the rubbery particles of the composition to migrate to the surface of the bat coincident with the elimination of the water, there is also incorporated in the treating composition a substance which is capable of inducing negative capillarity during the removal of the water phase.

To this end, there is added to the treating composition a thickening agent in such proportions, based on the weight of the wet mix, as to have no marked effect on the viscosity of the dispersion at the concentration in which the agent is initially employed, but capable of increasing the viscosity of the dispersed rubbery particles sufficiently during the elimination of the water to prevent their migration to the surface, thus insuring their retention as a coating on the individual fibers throughout the thickness of the bat.

The following is a typical example of a concentrated form of treating composition which may be employed, after being diluted with water, in the practice of the present invention:

|  | Dry Wt. | Wet Wt. | Per Cent Wet Wt. |
| --- | --- | --- | --- |
| Neoprene Latex 571 | 100 | 200 | 77.0 |
| Zinc Oxide | 5 | 10 | 3.9 |
| Agerite Powder (phenyl betanaphthylamine) | 1 | 2 | 0.8 |
| Casein | 0.5 | 5 | 1.9 |
| Wetting Agent | 2.0 | 20 | 7.7 |
| Thickening Agent | 2.25 | 22.5 | 8.7 |

Actual solids—48–50%   Viscosity—28,000 cps.   pH—10.3

While the polymer of 2,chlorobutadiene in aqueous dispersed form (neoprene latex) is preferable as the base of the treating composition, if desired, a GR-S latex, i. e., the rubbery copolymer in an aqueous dispersion of butadiene and styrene, or other similar types of dispersions of rubbery substances, may be substituted therefor.

Zinc oxide is the curing agent, and also serves to neutralize any acidity which might develop in the composition. Agerite powder (phenyl betanaphthylamine) is one of many proprietary antioxidants available that may be used for such purpose in the dispersion compound.

The casein is preferably added in a 10% solution containing approximately one part potassium hydroxide, and a smaller quantity of beta naphthol as a preservative, plus water. The casein, of course, will function as a stabilizer for the composition under storage conditions and will permit the composition to be applied by spraying or by use of dipping vats.

As previously indicated, the wetting agent is preferably a volatile type soap, such as ammonium oleate, morpholine soap, etc., and may be prepared as a 10% solution containing about four parts of oleic acid with one part ammonium hydroxide or monoethanolamine or morpholine, plus water, before being introduced into the base composition. By means of such wetting agent, the wetting time of the treating composition applied to glass fiber bodies may be as low as 10 seconds and need not require more than about 60 seconds.

The thickening agent added to the above composition may be selected from a group of vegetable gums, such as gum tragacanth, gum arabic, gum carab or algin, or may be either methyl cellulose, or bentonite clay. Employing, for instance, a 10% solution of methyl cellulose, preferably one of about 25 centipoises viscosity, in the above composition, but with the latter diluted to an extremely low total solids content of only 2%, the migration of the rubbery binder to the surface of a felted fiber glass material being treated with such a dilute composition is very definitely minimized with a concentration of no less than 0.16% methyl cellulose present, said proportion being based on the total wet weight of the dilute treating composition. Likewise, with a 10% solution of algin as the thickening agent, not less than 0.20% of the algin, based on the wet weight of the treating composition diluted to about a 2% solids content, will prevent migration of the dispersed rubbery binder. The upper limit of whatever thickener is used will depend, of course, entirely on the individual treating conditions encountered, but, in any case, should be less than the proportion which will produce a substantial increase in the inherent viscosity of the composition at the concentration initially employed.

Sufficient water is added to the concentrated composition, at the point of application, to dilute it to any desired solids content, which, in some cases, may be as low as the 2% solids content previously indicated. A treating composition of the above formulation with a low concentration of solids ranging between 2.0% and 10.0% preferably about 8.0%, resulted in rapid wetting time and good retention of solids after drying. A series of samples of the preformed fiber glass material 1″ thick were saturated in approximately 30 seconds using a treating composition of the above formulation (diluted to about 8.5% solids), then dried at 250° F. for about 3½ hours. The dried samples exhibited 47–60% saturation which, depending on the initial density of the bat, is well within the range found adequate to produce the degree of mass resilience and toughness that will permit use of the treated material as expansion joint filler strips. In certain cases, a treated strip exhibiting only about 10% saturation may still possess the requisite resilience and other characteristics desired for a particular application.

In addition to the resilience and water repellency obtained by treating a felted glass fiber sheet or strip with the composition of the present invention, the ultimate product produces less irritation while being manually handled because of the coating of the glass particles. The treated product also exhibits excellent "shot retention" properties obtained by the uniform coating of the fibers and the consequent confinement of the minute glass beads or "shot" otherwise loosely contained therewithin and easily shaken free during handling.

We claim:

1. A saturating composition for impregnating glass fiber sheet material which after impregnation is dried to produce glass fiber expansion joint filler strips, which composition comprises an aqueous dispersion of a rubbery binder, an evanescent water-miscible wetting agent and a small amount of a thickening agent from the group consisting of vegetable gums, algin, methyl cellulose, and bentonite clay, the amount of said thicknening agent present in said composition being insufficient to produce a substantial increase in the viscosity of the composition when it is diluted to a solid content of 2% to 10%, but sufficient to prevent migration of the rubbery binder to the surface of the impregnated glass fiber sheet material during the said drying thereof.

2. A saturating composition for impregnating glass fiber sheet material which after impregnation is dried to produce glass fiber expansion joint filler strips, which composition comprises an aqueous dispersion of a rubber-like polymer of 2,chlorbutadiene, an evanescent water-miscible wetting agent, and a small amount of a thickening agent from the group consisting of vegetable gums, algin, methyl cellulose, and bentonite clay, the amount of said thickening agent present in said composition being insufficient to produce a substantial increase in the viscosity of the composition when it is diluted to a solid content of 2% to 10%, but sufficient to prevent migration of the said polymer of 2,-chlorbutadiene to the surface of the impregnated glass fiber sheet material during the said drying thereof.

3. A saturating composition for impregnating glass fiber sheet material which after impregnation is dried to produce glass fiber expansion joint filler strips, which composition comprises an aqueous dispersion of a rubbery binder, an evanescent water-miscible wetting agent and a small amount of methyl cellulose, the amount of methyl cellulose present in said composition being insufficient to produce a substantial increase in the viscosity of the composition when it is diluted to a solid content of 2% to 10%, but sufficient to prevent migration of the rubbery binder to the surface of the impregnated glass fiber sheet material during the said drying thereof.

4. A saturating composition for impregnating glass fiber sheet material which after impregnation is dried to produce glass fiber expansion joint filler strips, which composition comprises an aqueous dispersion of a rubber-like polymer of 2,chlorbutadiene, an evanescent water-miscible wetting agent, and not less than .16% of methyl cellulose based on the total wet weight of the composition when diluted to a solid content of 2% to 10% and not more than the amount of methyl cellulose which produces a substantial increase in the viscosity of the diluted composition employed to effect the impregnation of the glass fiber sheet material to produce the glass fiber expansion joint filler strips.

RICHARD H. CUBBERLEY.
WILLIAM R. HARTMANN.

REFERENCES CITED

The following references are of record in the file of this patent:

UNITED STATES PATENTS

| Number | Name | Date |
| --- | --- | --- |
| 2,194,958 | Szegvari et al. | Mar. 26, 1940 |
| 2,265,364 | Fowler et al. | Dec. 9, 1941 |
| 2,405,724 | Wilder | Aug 13, 1946 |

OTHER REFERENCES

India Rubber World, New York, March 1943, (pages 565–568).